(12) United States Patent
Camblin et al.

(10) Patent No.: US 10,674,728 B2
(45) Date of Patent: Jun. 9, 2020

(54) PESTICIDAL COMPOSITIONS

(71) Applicant: SYNGENTA PARTICIPATIONS AG, Basel (CH)

(72) Inventors: Philippe Camblin, Basel (CH); Arne Pingel, Basel (CH)

(73) Assignee: Syngenta Participations AG, Basel (CH)

( * ) Notice: Subject to any disclaimer, the term of this patent is extended or adjusted under 35 U.S.C. 154(b) by 0 days.

(21) Appl. No.: 16/309,849

(22) PCT Filed: Jun. 6, 2017

(86) PCT No.: PCT/EP2017/063738
§ 371 (c)(1),
(2) Date: Dec. 13, 2018

(87) PCT Pub. No.: WO2017/215981
PCT Pub. Date: Dec. 21, 2017

(65) Prior Publication Data
US 2019/0142010 A1  May 16, 2019

(30) Foreign Application Priority Data
Jun. 13, 2016 (GB) .................................. 1610264.2

(51) Int. Cl.
*A01N 43/90* (2006.01)
*A01N 61/00* (2006.01)
*A01N 43/653* (2006.01)

(52) U.S. Cl.
CPC ........... *A01N 43/90* (2013.01); *A01N 43/653* (2013.01); *A01N 61/00* (2013.01)

(58) Field of Classification Search
CPC .................................................... A01N 43/90
See application file for complete search history.

(56) References Cited

U.S. PATENT DOCUMENTS

| 4,883,801 A * | 11/1989 | Nathanson | A01N 43/90 514/263.33 |
| 2008/0039321 A1* | 2/2008 | Bastiaans | A01N 43/90 504/136 |
| 2010/0216640 A1* | 8/2010 | Tobler | A01N 43/56 504/208 |

FOREIGN PATENT DOCUMENTS

WO    2009003428 A2    1/2009

OTHER PUBLICATIONS

Aremu, Adeyemi. Plant Science 238 (2015) 81-94.*
International Search Report and Written Opinion for International Patent Application No. PCT/EP2017/063738 dated Jul. 24, 2017.

* cited by examiner

*Primary Examiner* — Emily A Bernhardt
*Assistant Examiner* — Laura M Daniel
(74) *Attorney, Agent, or Firm* — Baker & Hostetler, LLP; Toni-Junell Herbert

(57) ABSTRACT

The present invention relates to pesticidal compositions. In particular it relates to composition comprising a compound of formula (I) and a further active ingredient. Such compositions are useful for the control of pests and/or for improving the yield of crop plants.

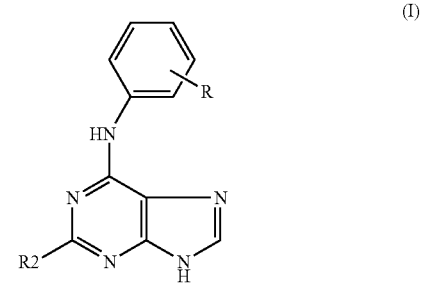

9 Claims, No Drawings

PESTICIDAL COMPOSITIONS

CROSS-REFERENCE TO RELATED APPLICATIONS

This application is a 371 National Stage application of International Application No. PCT/EP2017/063738, filed Jun. 6, 2017, which claims priority to Great Britain Application No. 16102464.2 filed Jun. 13, 2016, the entire contents of which applications are hereby incorporated by reference.

The present invention relates to pesticidal compositions. In particular it relates to composition comprising a compound of formula (I)

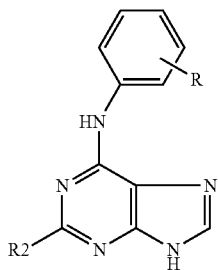

(I)

and a further active ingredient. Such compositions are useful for the control of pests and/or for improving the yield of crop plants.

Certain substituted 6-anilinopurine derivatives are known in the art (for example WO2009/003428) to inhibit cytokinin oxidase, and may therefore be useful in controlling the levels of cytokinin in plants.

According to the present invention, there is provided a composition comprising (A) a compound of formula (I),

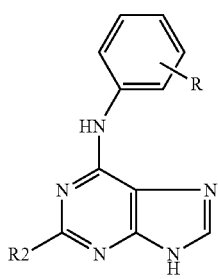

(I)

wherein R denotes one to five substituents independently selected from the group consisting of hydrogen, halogen, hydroxyl, amino, alkyloxy and alkyl;
and R2 is selected from the group consisting of amino, halogen, nitro, thio, alkylthio and alkyl;
and (B) at least one further active ingredient.

In certain compounds of formula (I), R is methoxy. In certain compounds of formula (I), R2 is halogen. In certain compounds of formula (I), R is methoxy and R2 is halogen. In certain compounds of formula (I), R2 is fluorine.

In one embodiment, component (A) is a compound of formula (Ia):

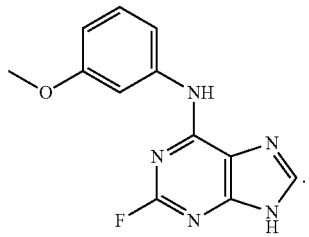

(Ia)

In one embodiment, component (B) is difenoconazole.

In one aspect of the present invention, there is provided a composition comprising the compound of formula (Ia) and difenoconazole.

In a further aspect of the present invention, there is provided a mixture of the compound of formula (Ia) and difenoconazole in a synergistically effective amount.

In one embodiment, component (B) is a protein hydrolysate.

In one aspect of the present invention, there is provided a composition comprising the compound of formula (Ia) and a protein hydrolysate.

In one aspect of the invention, the composition further comprises one or more formulation adjuvants.

Component (B) may be any known active ingredient, for example as disclosed in the Pesticide Manual (The Pesticide Manual—A World Compendium; Seventeenth edition; Editor: C. D. S. Tomlin; The British Crop Protection Council). In particular, component (B) may be an acaricide, bactericide, fungicide, herbicide, insecticide, miticide, molluscicide, nematicide, plant activator, plant growth regulator, biostimulant, rodenticide, safener, synergist, crop enhancing agent or an active ingredient that improves tolerance of plants to abiotic stress conditions. Component (B) may be a chemical or a biological pesticide.

In one embodiment, component (B) is a fungicide such as acibenzolar-S-methyl, aflaguard, aldimorph, ametoctradin, amisulbrom, anilazine, azaconazole, azoxystrobin, *Bacillus subtilis* strain QST 713, benalaxyl, benalaxyl-M, benodanil, benomyl, benthiavalicarb, benzothiostrobin, benzovindiflupyr, binapacryl, biphenyl, bitertanol, bixafen, blad, blasticidin-, boscalid, bromuconazole, captafol, captan, carbendazim, carboxin, carpropamid, chloroneb, chlorothalonil, chlozolinate, copper different salts, coumoxystrobin, cyazofamid, cyflufenamid, cymoxanil, cyproconazole, cyprodinil, dichlobentiazox, dichlofluanid, diclocymet, diclomezine, dicloran, diethofencarb, difenoconazole, diflumetorim, dimethirimol, dimethomorph, dimoxystrobin, diniconazole, dinocap, dipymetitrone, dithianon, dodemorph, dodine, edifenphos, enoxastrobin, epoxiconazole, plant essential oil, ethaboxam, ethirimol, etridiazole, famoxadone, fenamidone, fenaminstrobin, fenarimol, fenbuconazole, fenfuram, fenhexamid, fenoxanil, fenpropidin, fenpropimorph, fenpyrazamine, fentin acetate, fentin chloride, fentin hydroxide, ferbam, ferimzone, fluazinam, fludioxonil, flufenoxystrobin, fluindapyr, flumetralin, flumorph, fluopicolide, fluopyram, fluoxastrobin, fluquinconazole, flusilazole, flusulfamide, flutianil, flutolanil, flutriafol, fluxapyroxad, folpet, fosetyl-Al, fthalide, fuberidazole, furametpyr, guazatine, hexaconazole, hymexazole, imazalil, imibenconazole, iminoctadine, inatreq, iodocarb, ipconazole, ipfentrifluconazole, iprobenfos, iprodione, iprovalicarb, isofetamid, isoprothiolane, isopyrazam, isotianil, jiaxiangjhunzi, kasugamycin, kresoxim-methyl, laminarin, mancozeb, mandestrobin, mandipropamid, maneb, mefentrifluconazole, mepanipyrim, mepronil, meptyldinocap, metalaxyl, metalaxyl-M, metconazole, methasulfocarb, methyl, metiram, metominostrobin, metrafenone, myclobutanil, naftifine, nuarimol, octhilinone, ofurace, orysastrobin, oxathiapiprolin, oxolinic acid, oxpoconazole, oxycarboxin, oxytetracycline, paclobutrazol, pefurazoate, penconazole, pencycuron, penflufen, penthiopyrad, phenamacril, phophorous acid and salts, picarbutrazox, picoxystrobin, piperalin, polyoxin, probenazole, prochloraz, procymidone, propamocarb, propiconazole, propineb, proquinazid, prothiocarb, prothioconazole, pydiflumetofen, pyraclostrobin, pyrametostrobin, pyraoxystrobin, pyraziflumid, pyrazophos, pyribencarb, pyributicarb, pyrifenox, pyrimethanil, pyrimorph, pyriofenone, pyrisoxazole, pyroquilon, quinofumelin, quinoxyfen, quintozene, sedaxane, Serenade, silthiofam, simeconazole, spiroxamine, streptomycin, Taegro, tebuconazole, tebufloquin, teclofthalam, tecnazene, terbinafine, tetraconazole, thiabendazole, thifluzamide, thiophanate, thiophanate-methyl, thiram, tiadinil, tolclofos-methyl, tolprocarb, tolylfluanid, triadimefon, triadimenol, triazoxide, triclopyricarb, tricyclazole, tridemorph, trifloxystrobin, triflumizole, triforine, trinexapac-ethyl, triticonazole, validamycin, valifenalate, vinclozolin, zineb, ziram, zoxamide.

Preferably when component (B) is a fungicide, it is selected from the list consisting of: acibenzolar-S-methyl, azoxystrobin, benzovindiflupyr, bixafen, boscalid, captan, chlorothalonil, cyproconazole, cyprodonil, difenoconazole, fenpropidin, fenpropimorph, fluazinam, fludioxonil, fluopyram, fluoxastrobin, fluxapyroxad, hexaconazole, isopyrazam, mandipropamid, mefenoxam, metalaxyl, oxathiapoprolin, penconazole, penflufen, penthiopyrad, propiconazole, prothioconazole, pydiflumetofen, pyraclostrobin, sedaxane, tebuconazole, thiabendazole, thiram and trifloxystrobin.

More preferably, when component (B) is a fungicide it is selected from the list consisting of acibenzolar-S-methyl, azoxystrobin, benzovindiflupyr, difenoconazole, fludioxonil, hexaconazole, metalaxyl-m, metalyxyl, oxathiapiprolin, propiconazole, pydiflumetofen, sedaxane and thiabendazole.

In one embodiment, component (B) is selected from the list consisting of azoxystrobin, difenoconazole, hexaconazole, and propiconazole.

In one embodiment, component (B) is azoxystrobin.

In a further embodiment, component (B) is difenoconazole.

Component (B) may be an insecticide such as abamectin, acequinocyl, acetamiprid, acrinathrin, afidopyropen, afoxalaner, alanycarb, allethrin, alpha-cypermethrin, alphamethrin, amidoflumet, azadirachtin, azocyclotin, *Bacillus firmus, Bacillus thuringiensis, Beauveria bassiana*, bensultap, benzoximate, betacyfluthrin, bifenazate, binapacryl, bioallethrin, bioallethrin S-cyclopentyl isomer, bioresmethrin, bifenthrin, broflanilide, brofluthrinate, bromophos-ethyl, buprofezine, cadusafos, carbaryl, carbosulfan, cartap, chlorantraniliprole, chlorfenapyr, chloroprallethrin, chromafenozide, cloethocarb, clothianidin, cyantraniliprole, cyclaniliprole, cycloprothrin, cycloxaprid, *Cydia pomonella* granulosis virus, cyenopyrafen, cyflumetofen, cyfluthrin, cyhalodiamide, cyhalothrin, cypermethrin, cyphenothrin, cyromazine, deltamethrin, demeton-S-methyl, diafenthiuron, dialifos, dibrom, dicloromezotiaz, diflovidazine, diflubenzuron, dinactin, dinocap, dinotefuran, d-limonene, emamectin, empenthrin, epsilon-metofluthrin, epsilon-momfluorothrin, esfenvalerate, ethion, ethiprole, etofenprox, etoxazole, famphur, fenazaquin, fenfluthrin, fenobucarb, fenoxycarb, fenpropathrin, fenpyroximate, fenvalerate, fipronil, flometoquin, flonicamid, floupyram, fluacrypyrim, fluazaindolizine, fluazuron, flubendiamide, flucythrinate, flupyradifurone, fluensulfone, flufenerim, flufenprox, flufiprole, fluhexafon, flumethrin, flupyradifurone, fluralaner, fluvalinate, fluxametamide, fosthiazate, gamma-cyhalothrin, gossyplure, guadipyr, halofenozide, halofenprox, harpin, *Helicoverpa armigera* nucleopolyhedrovirus, *Helicoverpa zea* nucleopolyhedrovirus, *Heliothis virescens* nucleopolyhedrovirus, *Heliothis punctigera* nucleopolyhedrovirus, hexythiazox, hydramethylnon, imicyafos, imidacloprid, imiprothrin, indoxacarb, iodomethane, isothioate, ivermectin, kappa-bifenthrin, kappa-tefluthrin, lambda-cyhalothrin, lepimectin, lufenuron, metaflumizone, metaldehyde, methomyl, methoxyfenozide, metofluthrin, milbemectin, niclosamide, nitenpyram, oxamyl, parathionethyl, *Pasteuria nishizawae*, p-cymene, permethrin, phenothrin, phosphocarb, piperonylbutoxide, pirimicarb, pirimiphos-ethyl, *Plutella xylostella* granulosis virus, *Plutella xylostella* nucleopolyhedrovirus, polyhedrosis virus, prallethrin, profenofos, propargite, propetamphos, protrifenbute, pyflubumide, pymetrozine, pyraclofos, pyrafluprole, pyrethrum, pyridaben, pyridalyl, pyrifluquinazon, pyrimidifen, pyriprole, pyriproxyfen, QRD-420 terpenoid blend, QR-452 terpenoid blend, QRD-460 terpenoid blend, selamectin, silafluofen, spinetoram, spinosad, spirodiclofen, spiromesifen, spirotetramat, *Spodoptera frugiperda* nucleopolyhedrovirus, sulfoxaflor, tebufenozide, tebufenpyrad, tefluthrin, terpenoid blends, terpenoids, tetradiphon, tetramethrin, tetranactin, tetraniliprole, theta-cypermethrin, thiacloprid, thiamethoxam, thiodicarb, tioxazafen, tolfenpyrad, transfluthrin, trichlorfon, triflumezopyrim, zeta-cypermethrin, α-terpinene, 4-[(5S)-5-(3,5-dichloro-4-fluoro-phenyl)-5-(trifluoromethyl)-4H-isoxazol-3-yl]-N-[(4R)-2-ethyl-3-oxo-isoxazolidin-4-yl]-2-methyl-benzamide, or [3-(4-chloro-2,6-dimethyl-phenyl)-8-methoxy-1-methyl-2-oxo-1,8-diazaspiro[4.5]dec-3-en-4-yl] ethyl carbonate.

Preferably when component (B) is an insecticide, it is selected from the list consisting of abamectin, acetamiprid, azadirachtin, *Bacillus thuringiensis*, buprofezine, cartap, chlorantraniliprole, chlorfenapyr, clothianidin, cyantraniliprole, diafenthiuron, emamectin benzoate, ethiprole, flonicamid, flupyradifurone, imidacloprid, indoxacarb, lambda cyhalothrin, lufenuron, methoxyfenozide, *Helicoverpa armigera* nucleopolyhedrovirus, profenofos, pymetrozine, pyrethrum, QRD-460 terpenoid blend, spinosad, spirodiclofen, spiromesifen, spirotetramat, sulfoxaflor, tefluthrin, thiacloprid, thiamethoxam, thiodicarb, fluxametamide, 4-[(5S)-5-(3,5-dichloro-4-fluoro-phenyl)-5-(trifluoromethyl)-4H-isoxazol-3-yl]-N-[(4R)-2-ethyl-3-oxo-isoxazolidin-4-yl]-2-methyl-benzamide, or [3-(4-chloro-2,6-dimethyl-phenyl)-8-methoxy-1-methyl-2-oxo-1,8-diazaspiro[4.5]dec-3-en-4-yl] ethyl carbonate and *Beauveria bassiana*.

More preferably, when component (B) is an insecticide it is selected from the group consisting of abamectin, *Bacillus thuringiensis*, chlorantraniliprole, cyantraniliprole, flonicamid, flupyradifurone, pymetrozine, pyrethrum, QRD-460 terpenoid blend, spinosad, spirodiclofen, spiromesifen, spirotetramat, sulfoxaflor, 4-[(5S)-5-(3,5-dichloro-4-fluorophenyl)-5-(trifluoromethyl)-4H-isoxazol-3-yl]-N-[(4R)-2-ethyl-3-oxo-isoxazolidin-4-yl]-2-methyl-benzamide, or [3-(4-chloro-2,6-dimethyl-phenyl)-8-methoxy-1-methyl-2-oxo-1,8-diazaspiro[4.5]dec-3-en-4-yl] ethyl carbonate and thiamethoxam.

In one embodiment, component (B) is pymetrozine.

Component (B) may be a plant growth regulator such as 1-methylcyclopropene, 1-naphthol, 2,3,5-tri-iodobenzoic acid, 2,3-dihydro-5,6-diphenyl-1,4-oxath(II)ne, 2,4,5-T, 2,4-

D, 2,4-DB, 2,4-DEP, 24-epi-brassinolide, 28-homobrassinolide, 2-cyano-3-(2,4-dichlorophenyl)acrylic acid, 2-hydrazinoethanol, 2iP, 4-CPA, 4-hydroxyphenethyl alcohol, abscisic acid, AC 94377, ACC, ancymidol, auxins, aviglycine, bachmedesh, benzofluor, benzyladenine, 24-epi-brassinolide, 28-homo-brassinolide, brassinolide, brassinolide-ethyl, brassinosteroids, BTS 44584, buminafos, butralin, calcium cyanamide, carbaryl, carvone, chlorfluren, chlorflurenol, chlormequat-chloride, chlorphonium, chlorpropham, choline chloride, ciobutide, clofencet, clofibric acid, cloprop, cloxyfonac, cyanamide, cyclanilide, cycloheximide, cyprosulfamide, cytokinins, daminozide, DCPTA, deoxystrigol, dicamba-methyl, dichlorflurenol, dichlorflurenol-methyl, dichlorprop, dikegulac, dimexano, endothal, epocholeone, etacelasil, ethephon, ethychlozate, ethylene, fenoprop, fenridazon, flumetralin, fluoridamid, flurenol, flurprimidol, forchlorfenuron, fosamine, fuphenthiourea, furalane, gibberellic acid, gibberellins, glyoxime, glyphosine, GR-24, heptopargil, hexafluoroacetone trihydrate, holosulf, hymexazol, IAA, IBA, Inabenfide, INCYDE, isoprothiolane, isopyrimol, jasmonates, jasmonic acid, karetazan, karrikins, kinetin, lead arsenate, maleic hydrazide, MCPB, mefluidide, mepiquat, merphos, methasulfocarb, metoxuron, N-(2-ethyl-2H-pyrazol-3-yl)-N'-phenylurea, N-m-tolylphthalamic acid, N-pyrrolidinosuccinamic acid, naphthaleneacetamide, naphthoxyacetic acids, n-decanol, nonanoic acid, N-phenylphthalamic acid, orobanchol, paclobutrazol, pentachlorophenol, piproctanyl, potassium naphthenate, polyamines, prohexadione-calcium, prohydrojasmon, propham, propyl 3-tert-butylphenoxyacetate, prosuler, pydanon, pyrabactin, pyripropanol, quinabactin, salicylic acid, sintofen, sodium (Z)-3-chloroacrylate, sodium naphthenate, sorgolactone, strigol, strigolactones, tecnazene, tetcyclacis, thidiazuron, tiaojiean, triacontanol, triapenthenol, tribufos, trinexapac, trinexapac-ethyl, uniconazole, zeatin, α-naphthaleneacetic acid.

Preferably when component (B) is a plant growth regulator, it is selected from the list consisting of 1-methylcyclopropene, brassinolide, brassinosteroid, chlormequat-chloride, ethephon, flurprimidol, jasmonate, mepiquat, paclobutrazol, prohexadione-calcium, strigolactone and trinexapac-ethyl. More preferably, when component (B) is a plant growth regulator it is selected from the list consisting of brassinolide, chlormequat chloride, flurprimidol, mepiquat, paclobutrazol, prohexadione-calcium and trinexapac-ethyl.

Component (B) may be a product that enhances plant tolerance to abiotic stress. In particular there may be mentioned biostimulant products that contain one or more micronutrients, macronutrients, plant hormones, or amino acids. Examples of biostimulant products include seaweed extracts, protein hydrolyzates, Quantis™, Isabion™, Vitazyme™, Megafol™, Releaseed™, Biozyme™, TerraSorb™, Aminocore™, Radical™, Proplex™, Bio-forge™, Terrabiogen™, Folicist™, Cytozyme™, Cytoplant™, and Greenstim™.

Preferably when component (B) is a product that enhances plant tolerance to abiotic stress, it is selected from the group consisting of Quantis™ and Isabion∩.

In one embodiment, component (B) is Isabion™. Isabion™ (CAS number 9015-54-7) is a protein hydrolysate, that is a mixture of peptides and amino acids.

Component (B) may be a herbicide such as acetochlor, acifluorfen-sodium, aclonifen, alachlor, alloxydim, ametryn, amicarbazone, amidosulfuron, aminocyclopyrachlor, aminopyralid, amitrole, asulam, atrazine, bensulfuron-methyl, bentazone, bicyclopyrone, bifenox, bispyribac-sodium, bromacil, bromoxynil, butafenacil, cafenstrole, carfentrazone-ethyl, chlorimuron-ethyl, chlorotoluron, cinosulfuron, clethodim, clodinafop-propargyl, clomazone, clopyralid, cyhalofop-butyl, 2,4-D (including the choline salt and 2-ethylhexyl ester thereof), daimuron, desmedipham, dicamba (including the aluminum, aminopropyl, bis-aminopropylmethyl, choline, diglycolamine, dimethylamine, dimethylammonium, potassium and sodium salts thereof), diclofop-methyl, difenzoquat, diflufenican, diflufenzopyr, dimethachlor, dimethenamid-P, diquat dibromide, diuron, esprocarb, ethofumesate, fenoxaprop-P-ethyl, fenquinotrione, flazasulfuron, florasulam, fluazifop-P-butyl, flucarbazone-sodium, flufenacet, flumetralin, flumetsulam, flumioxazin, flupyrsulfuron-methyl-sodium, fluroxypyr-meptyl, fluthiacet-methyl, fomesafen, foramsulfuron, glufosinate (including the ammonium salt thereof), glyphosate (including the diammonium, isopropylammonium and potassium salts thereof), halauxifen-methyl, halosulfuron-methyl, haloxyfop-methyl, hexazinone, imazamox, imazapic, imazapyr, imazaquin, imazethapyr, indaziflam, iodosulfuron-methyl-sodium, iofensulfuron, iofensulfuron-sodium, ioxynil, ipfencarbazone, isoxaben, isoxaflutole, lactofen, linuron, mecoprop-P, mefenacet, mesosulfuron, mesosulfuron-methyl, mesotrione, metamitron, metobromuron, metolachlor, metoxuron, metribuzin, metsulfuron, molinate, napropamide, nicosulfuron, norflurazon, orthosulfamuron, oxadiargyl, oxadiazon, oxyfluorfen, paraquat dichloride, pendimethalin, penoxsulam, phenmedipham, picloram, picolinafen, pinoxaden, pretilachlor, primisulfuron-methyl, prodiamine, prometryn, propachlor, propanil, propaquizafop, propham, propyzamide, prosulfocarb, prosulfuron, pyrasulfotole, pyrazolynate, pyrazosulfuron-ethyl, pyribenzoxim, pyridate, pyriftalid, pyrithiobac-sodium, pyroxasulfone, pyroxsulam, quinclorac, quizalofop-P-ethyl, rimsulfuron, saflufenacil, sethoxydim, S-metolachlor, sulcotrione, sulfentrazone, tebuthiuron, tefuryltrione, tembotrione, terbuthylazine, terbutryn, thiencarbazone, thifensulfuron, tiafenacil, tolpyralate, topramezone, tralkoxydim, triafamone, triasulfuron, tribenuron-methyl, triclopyr, trifloxysulfuron-sodium, trifludimoxazin, tritosulfuron.

Component (B) may be a safener such as cloquintocet-mexyl, cyprosulfamide, dichlormid, fenchlorazole-ethyl, fenclorim, fluxofenim, isoxadifen-ethyl, mefenpyr-diethyl, N-(2-methoxybenzoyl)-4-[(methylaminocarbonyl)amino]benzenesulfonamide, oxabetrinil.

Component (B) may be an acaricide such as amitraz, chinomethionat, chlorobenzilate, cyenopyrafen, cyhexatin, dicofol, dienochlor, etoxazole, fenazaquin, fenbutatin oxide, fenpropathrin, fenpyroximate, hexythiazox, propargite, pyridaben and tebufenpyrad; a bactericide such as streptomycin; a molluscicide; a nematicide; a plant activator; a synergist; or a rodenticide.

The composition may comprise more than one compound from component (B), thus forming a mixture comprising three or more active ingredients For example component (B) may be two insecticides, an insecticide and a fungicide, an insecticide and a plant growth regulator, two fungicides, and so on.

The concentration of each of components (A) and (B) in the composition or methods of the present invention is from 0.01 mg/L to 500 g/L. In one embodiment, the concentration of component (A) is from 0.1 g/L to 100 g/L, in particular from 1 to 50 g/L, 1 to 20 g/L, 5 to 20 g/L, 5 to 10 g/L. In a further embodiment, the concentration of component (B) is from 0.1 to 250 g/L, in particular from 1 to 250 g/L, 1 to 100 g/L, 50 to 100 g/L, 1 to 50 g/L, 10 to 50 g/L.

In one embodiment, the concentration of component (A) is from 1 to 50 g/L and the concentration of component (B) is from 1 to 250 g/L.

In general, the weight ratio of component (A) to component (B) is from 1:1000 to 2000:1. In various embodiments, the weight ratio of component (A) to component (B) is from 1:100 to 100:1, from 1:50 to 100:1, from 1:20 to 50:1, from 1:10 to 50:1, from 1:1 to 1:100, from 1:1 to 1:50, from 1:1 to 40:1, from 1:1 to 35:1, from 1:1 to 30:1, from 1:1 to 25:1, from 1:1 to 20:1, from 1:1 to 15:1, from 1:1 to 10:1, from 1:1 to 5:1, from 2.5:1 to 50:1, from 2.5:1 to 40:1, from 2.5:1 to 35:1, from 2.5:1 to 30:1, from 2.5:1 to 25:1, from 2.5:1 to 20:1, from 2.5:1 to 15:1, from 2.5:1 to 10:1, from 2.5:1 to 5:1.

For example, the weight ratio of component (A) to component (B) may be 100:1, 90:1, 80:1, 75:1, 70:1, 65:1, 60:1, 55:1, 50:1, 49:1, 48:1, 47:1, 46:1, 45:1, 44:1, 43:1, 42:1, 41:1, 40:1, 39:1, 38:1, 37:1, 36:1, 35:1, 34:1, 33:1, 32:1, 31:1, 30:1, 29:1, 28:1, 27:1, 26:1, 25:1, 24:1, 23:1, 22:1, 21:1, 20:1, 19:1, 18:1, 17:1, 16:1, 15:1, 14:1, 13:1, 12:1, 11:1, 10:1, 9:1, 8:1, 7:1, 6:1, 5:1, 4:1, 3:1, 2:1, 1:1.

In one embodiment, when component (B) is difenoconazole, the weight ratio of (A) to (B) is from 1:1 to 100:1.

In a further embodiment, when component (B) is difenoconazole, the weight ratio of (A) to (B) is from 2.5:1 to 40:1.

When component (B) is difenoconazole and the composition is for control of *Rhizoctonia solani* a weight ratio of 1:1 to 20:1, or 2.5:1 to 10:1 is preferred.

When component (B) is difenoconazole and the composition is for control of *Pyricularia orzya* a weight ratio of 1:1 to 50:1, or 2.5:1 to 40:1 is preferred.

When component (B) is difenoconazole and the composition is for control of *Glomerella lagenarium* a weight ratio of 1:1 to 10:1, or 2.5:1 to 40:1 is preferred.

Certain weight ratios of component (A) to component (B) may give rise to synergistic activity. Therefore, according to a further aspect of the invention there is provided a composition, wherein component (A) and component (B) are present in the composition in amounts producing a synergistic effect. This synergistic activity is apparent from the fact that the activity of the composition comprising component (A) and component (B) is greater than the sum of the corresponding activities of component (A) and of component (B) alone. This synergistic activity extends the range of action of component (A) and component (B) in two ways. Firstly, the rates of application of component (A) and component (B) are lowered whilst the action remains equally good, meaning that the active ingredient mixture still achieves a high degree of pest control even where the two individual components have become totally ineffective in such a low application rate range. Secondly, there is a substantial broadening of the spectrum of pests that can be controlled.

A synergistic effect exists whenever the action of an active ingredient combination is greater than the sum of the actions of the individual components. The action to be expected E for a given active ingredient combination obeys the so-called COLBY formula and can be calculated as follows (COLBY, S. R. "Calculating synergistic and antagonistic responses of herbicide combination". Weeds, Vol. 15, pages 20-22; 1967):

ppm=milligrams of active ingredient (a.i.) per liter
X=% action by first active ingredient using p ppm of the active ingredient
Y=% action by second active ingredient using q ppm of the active ingredient.

According to Colby, the expected (additive) action of active ingredients A+B using p+q ppm of active ingredient is $$E = X + Y - \frac{X \cdot Y}{100}$$

If the action actually observed O is greater than the expected action E, then the action of the combination is super-additive, i.e. there is a synergistic effect. In mathematical terms, synergism corresponds to a positive value for the difference of (O-E). In the case of purely complementary addition of activities (expected activity), said difference (O-E) is zero. A negative value of said difference (O-E) signals a loss of activity compared to the expected activity.

However, besides any synergistic action, the compositions according to the invention can also have further surprising advantageous properties. Examples of such advantageous properties that may be mentioned are: more advantageous degradability; improved toxicological and/or ecotoxicological behaviour; or improved characteristics of the useful plants including: emergence, crop yields, more developed root system, tillering increase, increase in plant height, bigger leaf blade, less dead basal leaves, stronger tillers, greener leaf colour, less fertilizers needed, less seeds needed, more productive tillers, earlier flowering, early grain maturity, less plant verse (lodging), increased shoot growth, improved plant vigour, and early germination.

Compositions of the present invention may be applied to a pest, plant, plant propagation material or plant growing locus either simultaneously (for example as a pre-formulated mixture or a tank mix), or sequentially in a suitable timescale. Co-application of components (A) and (B) has the added benefit of minimising farmer time spent applying products to crops. The combination may also encompass specific plant traits incorporated into the plant using any means, for example conventional breeding or genetic modification.

In one embodiment, the composition comprises an agriculturally acceptable formulation adjuvant. In a further embodiment, there is provided a composition consisting essentially of component (A), component (B) and an agriculturally acceptable adjuvant. In a further embodiment, there is provided a composition consisting of component (A), component (B) and an agriculturally acceptable adjuvant. The compositions of the present invention are generally formulated using formulation adjuvants, such as carriers, solvents and surface-active agents (SFAs).

The compounds of formula I of this invention are useful as plant disease control agents. The present invention therefore further comprises a method for controlling plant diseases caused by fungal plant pathogens comprising applying to the plant or portion thereof to be protected, or to the plant seed to be protected, an effective amount of the compositions of the invention. In one aspect of the invention, the composition comprises the compound of formula (Ia) and difenoconazole in a synergistically effective amount.

Fungicidal compositions of the present invention may be used to control plant diseases caused by a broad spectrum of fungal plant pathogens in the Basidiomycete, Ascomycete, Oomycete and/or Deuteromycete, Blasocladiomycete, Chrytidiomycete, Glomeromycete and/or Mucoromycete classes.

They are effective in controlling a broad spectrum of plant diseases, such as foliar pathogens of ornamental, turf, vegetable, field, cereal, and fruit crops.

These pathogens may include:

Oomycetes, including *Phytophthora* diseases such as those caused by *Phytophthora capsici, Phytophthora infestans, Phytophthora sojae, Phytophthora fragariae, Phytophthora nicotianae, Phytophthora cinnamomi, Phytophthora citricola, Phytophthora citrophthora* and *Phytophthora erythroseptica*; Pythium diseases such as those caused by *Pythium aphanidermaturn, Pythium arrhenomanes, Pythium graminicola, Pythium irregulare* and *Pythium ultimum*; diseases caused by Peronosporales such as *Peronospora destructor, Peronospora parasitica, Plasmopara viticola, Plasmopara halstedii, Pseudoperonospora cubensis, Albugo candida, Sclerophthora macrospora* and *Bremia lactucae*; and others such as *Aphanomyces cochlioides, Labyrinthula zosterae, Peronosclerospora sorghi* and *Sclerospora graminicola*.

Ascomycetes, including blotch, spot, blast or blight diseases and/or rots for example those caused by Pleosporales such as *Stemphylium solani, Stagonospora tainanensis, Spilocaea oleaginea, Setosphaeria turcica, Pyrenochaeta lycoperisici, Pleospora herbarum, Phoma destructiva, Phaeosphaeria herpotrichoides, Phaeocryptocus gaeumannii, Ophiosphaerella graminicola, Ophiobolus graminis, Leptosphaeria maculans, Hendersonia creberrima, Helminthosporium triticirepentis, Setosphaeria turcica, Drechslera glycines, Didymella bryoniae, Cycloconium oleagineum, Corynespora cassiicola, Cochliobolus sativus, Bipolaris cactivora, Venturia inaequalis, Pyrenophora teres, Pyrenophora tritici-repentis, Alternaria alternata, Alternaria brassicicola, Alternaria solani* and *Alternaria tomatophila*, Capnodiales such as *Septoria tritici, Septoria nodorum, Septoria glycines, Cercospora arachidicola, Cercospora sojina, Cercospora zeae-maydis, Cercosporella capsellae* and *Cercosporella herpotrichoides, Cladosporium carpophilum, Cladosporium effusum, Passalora fulva, Cladosporium oxysporum, Dothistroma septosporum, Isariopsis clavispora, Mycosphaerella fijiensis, Mycosphaerella graminicola, Mycovellosiella koepkeii, Phaeoisariopsis bataticola, Pseudocercospora vitis, Pseudocercosporella herpotrichoides, Ramularia beticola, Ramularia collo-cygni*, Magnaporthales such as *Gaeumannomyces graminis, Magnaporthe grisea, Pyricularia oryzae*, Diaporthales such as *Anisogramma anomala, Apiognomonia errabunda, Cytospora platani, Diaporthe phaseolorum, Discula destructiva, Gnomonia fructicola, Greeneria uvicola, Melanconium juglandinum, Phomopsis viticola, Sirococcus clavigignenti-juglandacearum, Tubakia dryina, Dicarpella* spp., *Valsa ceratosperma*, and others such as *Actinothyrium graminis, Ascochyta pisi, Aspergillus flavus, Aspergillus fumigatus, Aspergillus nidulans, Asperisporium caricae, Blumeriella jaapii, Candida* spp., *Capnodium ramosum, Cephaloascus* spp., *Cephalosporium gramineum, Ceratocystis paradoxa, Chaetomium* spp., *Hymenoscyphus pseudoalbidus, Coccidioides* spp., *Cylindrosporium padi, Diplocarpon malae, Drepanopeziza campestris, Elsinoe ampelina, Epicoccum nigrum, Epidermophyton* spp., *Eutypa lata, Geotrichum candidum, Gibellina cerealis, Gloeocercospora sorghi, Gloeodes pomigena, Gloeosporium perennans; Gloeotinia temulenta, Griphospaeria corticola, Kabatiella lini, Leptographium microsporum, Leptosphaerulinia crassiasca, Lophodermium seditiosum, Marssonina graminicola, Microdochium nivale, Monilinia fructicola, Monographella albescens, Monosporascus cannonballus, Naemacyclus* spp., *Ophiostoma novo-ulmi, Paracoccidioides brasiliensis, Penicillium expansum, Pestalotia rhododendri, Petrieffidium* spp., *Pezicula* spp., *Phialophora gregata, Phyllachora pomigena, Phymatotrichum omnivora, Physalospora abdita, Plectosporium tabacinum, Polyscytalum pustulans, Pseudopeziza medicaginis, Pyrenopeziza brassicae, Ramulispora sorghi, Rhabdocline pseudotsugae, Rhynchosporium secalis, Sacrocladium oryzae, Scedosporium* spp., *Schizothyrium pomi, Sclerotinia sclerotiorum, Sclerotinia minor, Sclerotium* spp., *Typhula ishikariensis, Seimatosporium mariae, Lepteutypa cupressi, Septocyta ruborum, Sphaceloma perseae, Sporonema phacidioides, Stigmina palmivora, Tapesia yallundae, Taphrina bullata, Thielviopsis basicola, Trichoseptoria fructigena, Zygophiala jamaicensis*; powdery mildew diseases for example those caused by Erysiphales such as *Blumeria graminis, Erysiphe polygoni, Uncinula necator, Sphaerotheca fuligena, Podosphaera leucotricha, Podospaera macularis Golovinomyces cichoracearum, Leveillula taurica, Microsphaera diffusa, Oidiopsis gossypii, Phyllactinia guttata* and *Oidium arachidis*; molds for example those caused by Botryosphaeriales such as *Dothiorella aromatica, Diplodia seriata, Guignardia bidweffii, Botrytis cinerea, Botryotinia allii, Botryotinia fabae, Fusicoccum amygdali, Lasiodiplodia theobromae, Macrophoma theicola, Macrophomina phaseolina, Phyllosticta cucurbitacearum*; anthracnoses for example those caused by Glommerelales such as *Colletotrichum gloeosporioides, Colletotrichum lagenarium, Colletotrichum gossypii, Glomerella cingulata*, and *Colletotrichum graminicola*; and wilts or blights for example those caused by Hypocreales such as *Acremonium strictum, Claviceps purpurea, Fusarium culmorum, Fusarium graminearum, Fusarium virguliforme, Fusarium oxysporum, Fusarium subglutinans, Fusarium oxysporum* f.sp. cubense, *Gerlachia nivale, Gibberella fujikuroi, Gibberella zeae, Gliocladium* spp., *Myrothecium verrucaria, Nectria ramulariae, Trichoderma viride, Trichothecium roseum*, and *Verticillium theobromae*.

Basidiomycetes, including smuts for example those caused by Ustilaginales such as *Ustilaginoidea virens, Ustilago nuda, Ustilago tritici, Ustilago zeae*, rusts for example those caused by Pucciniales such as *Cerotelium fici, Chrysomyxa arctostaphyli, Coleosporium ipomoeae, Hemileia vastatrix, Puccinia arachidis, Puccinia cacabata, Puccinia graminis, Puccinia recondita, Puccinia sorghi, Puccinia hordei, Puccinia striiformis* f.sp. Hordei, *Puccinia striiformis* f.sp. Secalis, *Pucciniastrum coryli*, or Uredinales such as *Cronartium ribicola, Gymnosporangium juniperi-viginianae, Melampsora medusae, Phakopsora pachyrhizi, Phragmidium mucronatum, Physopella ampelosidis, Tranzschelia discolor* and *Uromyces viciae-fabae*; and other rots and diseases such as those caused by *Cryptococcus* spp., *Exobasidium vexans, Marasmiellus inoderma, Mycena* spp., *Sphacelotheca reiliana, Typhula ishikariensis, Urocystis agropyri, Itersonilia perplexans, Corticium invisum, Laetisaria fuciformis, Waitea circinata, Rhizoctonia solani, Thanetephorus cucurmeris, Entyloma dahliae, Entylomella microspora, Neovossia moliniae* and *Tilletia caries*.

Blastocladiomycetes, such as *Physoderma maydis*.

Mucoromycetes, such as *Choanephora cucurbitarum; Mucor* spp.; *Rhizopus arrhizus*, As well as diseases caused by other species and genera closely related to those listed above.

In addition to their fungicidal activity, the compounds and compositions comprising them may also have activity against bacteria such as *Erwinia amylovora, Erwinia cara-*

*tovora, Xanthomonas campestris, Pseudomonas syringae, Strptomyces scabies* and other related species as well as certain protozoa.

Plant disease control is ordinarily accomplished by applying an effective amount of a compound of this invention either pre- or post-infection, to the portion of the plant to be protected such as the roots, stems, foliage, fruit, seeds, tubers or bulbs, or to the media (soil or sand) in which the plants to be protected are growing. The compounds may also be applied to seeds to protect the seeds and seedlings developing from the seeds. The compounds may also be applied through irrigation water to treat plants.

Rates of application for these compounds can be influenced by many factors of the environment and should be determined under actual use conditions. Foliage can normally be protected when treated at a rate of from less than about 1 g/ha to about 5,000 g/ha of active ingredient. Seed and seedlings can normally be protected when seed is treated at a rate of from about 0.1 to about 10 g per kilogram of seed.

The present invention provides a method for controlling pests in or on crop plants, improving the tolerance of crop plants to abiotic stress conditions, and/or improving the yield of crop plants, comprising treating the pests, plants, plant parts, plant propagation material, or plant growing locus with a composition as described herein.

The present invention provides a method for controlling pests in or on crop plants, improving the tolerance of crop plants to abiotic stress conditions, and/or improving the yield of crop plants, comprising treating the pests, plants, plant parts, plant propagation material, or plant growing locus with a composition as described herein.

The present invention provides a method of controlling pests, comprising applying to the pest, or locus where the pest is present, a composition as described herein.

In one embodiment the pest is a fungus.

In one embodiment, the fungal pest is selected from the group consisting of *Rhizoctonia solani, Pyricularia orzyae* and *Glomerella lagenarium.*

The present invention provides a method of improving the tolerance of a plant to abiotic stress, wherein the method comprises applying to the plant, plant part, plant propagation material, or plant growing locus a composition as described herein.

The present invention provides a method for regulating or improving the growth of a plant, wherein the method comprises applying to the plant, plant propagation material, or plant growing locus a composition as described herein. In one embodiment, plant growth is regulated or improved when the plant is subject to abiotic stress conditions.

The term "regulating or improving the growth of a plant" means an improvement in plant vigour, an improvement in plant quality, improved tolerance to stress factors, and/or improved input use efficiency.

The term "plants" refers to all physical parts of a plant, including seeds, seedlings, saplings, roots, tubers, stems, stalks, foliage, and fruits.

The term "locus" as used herein means fields in or on which plants are growing, or where seeds of cultivated plants are sown, or where seed will be placed into the soil. It includes soil, seeds, and seedlings, as well as established vegetation.

The term "plant propagation material" denotes all generative parts of a plant, for example seeds or vegetative parts of plants such as cuttings and tubers. It includes seeds in the strict sense, as well as roots, fruits, tubers, bulbs, rhizomes, and parts of plants.

Where a range of numbers is disclosed herein (for example, 1 to 10), this is intended to include all numbers and intervening values within that range (for example, 1, 1.1, 2, 3, 3.9, 4, 5, 6, 6.5, 7, 8, 9 and 10) and also any sub-range of numbers and intervening values within that range (for example, 2 to 8, 1.5 to 5.5 and 3.1 to 4.7). Additionally, it is intended that the both the upper and lower limits specified are included within the range.

Where ranges or values used herein are preceded by the term "about", this term is intended to provide support for both the exact number that it precedes, and also a number that is near to or approximately the number that it precedes. In determining whether a number is near to or approximately a specifically recited number, the near or approximating number may be a number, which would be rounded to or be substantially equivalent to the specifically recited number. For example, the term "about 5" includes 5.0, 4.5, 5.4, 4.92, 5.01, and so on.

The composition can be in the form of concentrates which are diluted prior to use, although ready-to-use compositions can also be made. The final dilution is usually made with water, but can be made instead of, or in addition to, water, with, for example, liquid fertilisers, micronutrients, biological organisms, oil or solvents.

The compositions according to the invention are generally formulated in various ways using formulation adjuvants, such as carriers, solvents and surface-active substances. The formulations can be in various physical forms, e.g. in the form of dusting powders, gels, wettable powders, water-dispersible granules, water-dispersible tablets, effervescent pellets, emulsifiable concentrates, micro-emulsifiable concentrates, oil-in-water emulsions, oil-flowables, aqueous dispersions, oily dispersions, suspo-emulsions, capsule suspensions, emulsifiable granules, soluble liquids, water-soluble concentrates (with water or a water-miscible organic solvent as carrier), impregnated polymer films or in other forms known e.g. from the Manual on Development and Use of FAO and WHO Specifications for Pesticides, United Nations, First Edition, Second Revision (2010). Such formulations can either be used directly or diluted prior to use. The dilutions can be made, for example, with water, liquid fertilisers, micronutrients, biological organisms, oil or solvents.

The formulations can be prepared e.g. by mixing the active ingredient with the formulation adjuvants in order to obtain compositions in the form of finely divided solids, granules, solutions, dispersions or emulsions. The active ingredients can also be formulated with other adjuvants, such as finely divided solids, mineral oils, oils of vegetable or animal origin, modified oils of vegetable or animal origin, organic solvents, water, surface-active substances or combinations thereof.

The active ingredients can also be contained in very fine microcapsules. Microcapsules contain the active ingredients in a porous carrier. This enables the active ingredients to be released into the environment in controlled amounts (e.g. slow-release). Microcapsules usually have a diameter of from 0.1 to 500 microns. They contain active ingredients in an amount of about from 25 to 95% by weight of the capsule weight. The active ingredients can be in the form of a monolithic solid, in the form of fine particles in solid or liquid dispersion or in the form of a suitable solution. The encapsulating membranes can comprise, for example, natural or synthetic rubbers, cellulose, styrene/butadiene copolymers, polyacrylonitrile, polyacrylate, polyesters, polyamides, polyureas, polyurethane or chemically modified polymers and starch xanthates or other polymers that are known to the person skilled in the art. Alternatively, very fine microcapsules can be formed in which the active ingredient is contained in the form of finely divided particles in a solid matrix of base substance, but the microcapsules are not themselves encapsulated.

The formulation adjuvants that are suitable for the preparation of the compositions according to the invention are known per se. As liquid carriers there may be used: water, toluene, xylene, petroleum ether, vegetable oils, acetone, methyl ethyl ketone, cyclohexanone, acid anhydrides, acetonitrile, acetophenone, amyl acetate, 2-butanone, butylene carbonate, chlorobenzene, cyclohexane, cyclohexanol, alkyl esters of acetic acid, diacetone alcohol, 1,2-dichloropropane, diethanolamine, p-diethylbenzene, diethylene glycol, diethylene glycol abietate, diethylene glycol butyl ether, diethylene glycol ethyl ether, diethylene glycol methyl ether, N,N-dimethylformamide, dimethyl sulfoxide, 1,4-dioxane, dipropylene glycol, dipropylene glycol methyl ether, dipropylene glycol dibenzoate, diproxitol, alkylpyrrolidone, ethyl acetate, 2-ethylhexanol, ethylene carbonate, 1,1,1-trichloroethane, 2-heptanone, alpha-pinene, d-limonene, ethyl lactate, ethylene glycol, ethylene glycol butyl ether, ethylene glycol methyl ether, gamma-butyrolactone, glycerol, glycerol acetate, glycerol diacetate, glycerol triacetate, hexadecane, hexylene glycol, isoamyl acetate, isobornyl acetate, isooctane, isophorone, isopropylbenzene, isopropyl myristate, lactic acid, laurylamine, mesityl oxide, methoxypropanol, methyl isoamyl ketone, methyl isobutyl ketone, methyl laurate, methyl octanoate, methyl oleate, methylene chloride, m-xylene, n-hexane, n-octylamine, octadecanoic acid, octylamine acetate, oleic acid, oleylamine, o-xylene, phenol, polyethylene glycol, propionic acid, propyl lactate, propylene carbonate, propylene glycol, propylene glycol methyl ether, p-xylene, toluene, triethyl phosphate, triethylene glycol, xylenesulfonic acid, paraffin, mineral oil, trichloroethylene, perchloroethylene, ethyl acetate, amyl acetate, butyl acetate, propylene glycol methyl ether, diethylene glycol methyl ether, methanol, ethanol, isopropanol, and alcohols of higher molecular weight, such as amyl alcohol, tetrahydro-furfuryl alcohol, hexanol, octanol, ethylene glycol, propylene glycol, glycerol, N-methyl-2-pyrrolidone and the like.

Suitable solid carriers are, for example, talc, titanium dioxide, pyrophyllite clay, silica, attapulgite clay, kieselguhr, limestone, calcium carbonate, bentonite, calcium montmorillonite, cottonseed husks, wheat flour, soybean flour, pumice, wood flour, ground walnut shells, lignin and similar substances.

A large number of surface-active substances can advantageously be used in both solid and liquid formulations, especially in those formulations which can be diluted with a carrier prior to use. Surface-active substances may be anionic, cationic, non-ionic or polymeric and they can be used as emulsifiers, wetting agents or suspending agents or for other purposes. Typical surface-active substances include, for example, salts of alkyl sulfates, such as diethanolammonium lauryl sulfate; salts of alkylarylsulfonates, such as calcium dodecyl-benzenesulfonate; alkylphenol/alkylene oxide addition products, such as nonylphenol ethoxylate; alcohol/alkylene oxide addition products, such as tridecylalcohol ethoxylate; soaps, such as sodium stearate; salts of alkylnaphthalenesulfonates, such as sodium dibutylnaphthalenesulfonate; dialkyl esters of sulfosuccinate salts, such as sodium di(2-ethylhexyl)sulfosuccinate; sorbitol esters, such as sorbitol oleate; quaternary amines, such as lauryltrimethylammonium chloride, polyethylene glycol esters of fatty acids, such as polyethylene glycol stearate; block copolymers of ethylene oxide and propylene oxide; and salts of mono and di-alkylphosphate esters; and also further substances described e.g. in McCutcheon's Detergents and Emulsifiers Annual, MC Publishing Corp., Ridgewood N.J. (1981).

Further adjuvants that can be used in pesticidal formulations include crystallisation inhibitors, viscosity modifiers, suspending agents, dyes, anti-oxidants, foaming agents, light absorbers, mixing auxiliaries, antifoams, complexing agents, neutralising or pH-modifying substances and buffers, corrosion inhibitors, fragrances, wetting agents, take-up enhancers, micro-nutrients, plasticisers, glidants, lubricants, dispersants, thickeners, antifreezes, microbicides, and liquid and solid fertilisers.

The compositions according to the invention can include an additive comprising an oil of vegetable or animal origin, a mineral oil, alkyl esters of such oils or mixtures of such oils and oil derivatives. The amount of oil additive in the composition according to the invention is generally from 0.01 to 10%, based on the mixture to be applied. For example, the oil additive can be added to a spray tank in the desired concentration after a spray mixture has been prepared. Preferred oil additives comprise mineral oils or an oil of vegetable origin, for example rapeseed oil, olive oil or sunflower oil, emulsified vegetable oil, alkyl esters of oils of vegetable origin, for example the methyl derivatives, or an oil of animal origin, such as fish oil or beef tallow. Preferred oil additives comprise alkyl esters of C8 C22 fatty acids, especially the methyl derivatives of C12-C18 fatty acids, for example the methyl esters of lauric acid, palmitic acid and oleic acid (methyl laurate, methyl palmitate and methyl oleate, respectively). Many oil derivatives are known from the Compendium of Herbicide Adjuvants, 10th Edition, Southern Illinois University, 2010.

The inventive compositions generally comprise from 0.1 to 99% by weight, especially from 0.1 to 95% by weight, of compounds of the present invention and from 1 to 99.9% by weight of a formulation adjuvant which preferably includes from 0 to 25% by weight of a surface-active substance. Whereas commercial products may preferably be formulated as concentrates, the end user will normally employ dilute formulations.

The rates of application vary within wide limits and depend on the nature of the soil, the method of application, the crop plant, the pest to be controlled, the prevailing climatic conditions, and other factors governed by the method of application, the time of application and the target crop. As a general guideline compounds may be applied at a rate of from 1 to 2000 l/ha, especially from 1 to 1000 l/ha, or 1 to 500 l/ha.

In one embodiment each of components (A) and (B) are applied at a rate of from 1 to 250 gAI/ha. In further embodiments, component (A) is applied at a rate of from 1 to 50 gAI/ha, from 1 to 20 gAI/ha, from 5 to 20 gAI/ha, from 5 to 10 gAI/ha, or at a rate of about 10 gAI/ha. In further embodiments, component (B) is applied at a rate of from 1 to 100 gAI/ha, from 1 to 50 gAI/ha.

Preferred formulations can have the following compositions (weight %):
Emulsifiable concentrates:
active ingredient: 1 to 95%, preferably 60 to 90%
surface-active agent: 1 to 30%, preferably 5 to 20%
liquid carrier: 1 to 80%, preferably 1 to 35%
Dusts:
active ingredient: 0.1 to 10%, preferably 0.1 to 5%
solid carrier: 99.9 to 90%, preferably 99.9 to 99%

Suspension concentrates:
active ingredient: 5 to 75%, preferably 10 to 50%
water: 94 to 24%, preferably 88 to 30%
surface-active agent: 1 to 40%, preferably 2 to 30%
Wettable powders:
active ingredient: 0.5 to 90%, preferably 1 to 80%
surface-active agent: 0.5 to 20%, preferably 1 to 15%
solid carrier: 5 to 95%, preferably 15 to 90%
Granules:
active ingredient: 0.1 to 30%, preferably 0.1 to 15%
solid carrier: 99.5 to 70%, preferably 97 to 85%
The following Examples further illustrate, but do not limit, the invention.

| Wettable powders | a) | b) | c) |
| --- | --- | --- | --- |
| active ingredients | 25% | 50% | 75% |
| sodium lignosulfonate | 5% | 5% | — |
| sodium lauryl sulfate | 3% | — | 5% |
| sodium diisobutylnaphthalenesulfonate | — | 6% | 10% |
| phenol polyethylene glycol ether (7-8 mol of ethylene oxide) | — | 2% | — |
| highly dispersed silicic acid | 5% | 10% | 10% |
| Kaolin | 62% | 27% | — |

The combination is thoroughly mixed with the adjuvants and the mixture is thoroughly ground in a suitable mill, affording wettable powders that can be diluted with water to give suspensions of the desired concentration.

| Powders for dry seed treatment | a) | b) | c) |
| --- | --- | --- | --- |
| active ingredients | 25% | 50% | 75% |
| light mineral oil | 5% | 5% | 5% |
| highly dispersed silicic acid | 5% | 5% | — |
| Kaolin | 65% | 40% | — |
| Talcum | — | — | 20 |

The combination is thoroughly mixed with the adjuvants and the mixture is thoroughly ground in a suitable mill, affording powders that can be used directly for seed treatment.

| Emulsifiable concentrate | |
| --- | --- |
| active ingredients | 10% |
| octylphenol polyethylene glycol ether (4-5 mol of ethylene oxide) | 3% |
| calcium dodecylbenzenesulfonate | 3% |
| castor oil polyglycol ether (35 mol of ethylene oxide) | 4% |
| Cyclohexanone | 30% |
| xylene mixture | 50% |

Emulsions of any required dilution, which can be used in plant protection, can be obtained from this concentrate by dilution with water.

| Dusts | a) | b) | c) |
| --- | --- | --- | --- |
| Active ingredients | 5% | 6% | 4% |
| Talcum | 95% | — | — |
| Kaolin | — | 94% | — |
| mineral filler | — | — | 96% |

Ready-for-use dusts are obtained by mixing the combination with the carrier and grinding the mixture in a suitable mill. Such powders can also be used for dry dressings for seed.

| Extruder granules | |
| --- | --- |
| Active ingredients | 15% |
| sodium lignosulfonate | 2% |
| carboxymethylcellulose | 1% |
| Kaolin | 82% |

The combination is mixed and ground with the adjuvants, and the mixture is moistened with water. The mixture is extruded and then dried in a stream of air.

| Coated granules | |
| --- | --- |
| Active ingredients | 8% |
| polyethylene glycol (mol. wt. 200) | 3% |
| Kaolin | 89% |

The finely ground combination is uniformly applied, in a mixer, to the kaolin moistened with polyethylene glycol. Non-dusty coated granules are obtained in this manner.

| Suspension concentrate | |
| --- | --- |
| active ingredients | 40% |
| propylene glycol | 10% |
| nonylphenol polyethylene glycol ether (15 mol of ethylene oxide) | 6% |
| Sodium lignosulfonate | 10% |
| carboxymethylcellulose | 1% |
| silicone oil (in the form of a 75% emulsion in water) | 1% |
| Water | 32% |

The finely ground combination is intimately mixed with the adjuvants, giving a suspension concentrate from which suspensions of any desired dilution can be obtained by dilution with water. Using such dilutions, living plants as well as plant propagation material can be treated and protected against infestation by microorganisms, by spraying, pouring or immersion.

| Flowable concentrate for seed treatment | |
| --- | --- |
| active ingredients | 40% |
| propylene glycol | 5% |
| copolymer butanol PO/EO | 2% |
| Tristyrenephenole with 10-20 moles EO | 2% |
| 1,2-benzisothiazolin-3-one (in the form of a 20% solution in water) | 0.5% |
| monoazo-pigment calcium salt | 5% |
| Silicone oil (in the form of a 75% emulsion in water) | 0.2% |
| Water | 45.3% |

The finely ground combination is intimately mixed with the adjuvants, giving a suspension concentrate from which suspensions of any desired dilution can be obtained by dilution with water. Using such dilutions, living plants as well as plant propagation material can be treated and protected against infestation by microorganisms, by spraying, pouring or immersion.

Slow Release Capsule Suspension 28 parts of the combination are mixed with 2 parts of an aromatic solvent and 7 parts of toluene diisocyanate/polymethylene-polyphenylisocyanate-mixture (8:1). This mixture is emulsified in a mixture of 1.2 parts of polyvinylalcohol, 0.05 parts of a defoamer and 51.6 parts of water until the desired particle size is achieved. To this emulsion a mixture of 2.8 parts 1,6-diaminohexane in 5.3 parts of water is added. The mixture is agitated until the polymerization reaction is completed. The obtained capsule suspension is stabilized by adding 0.25 parts of a thickener and 3 parts of a dispersing agent. The capsule suspension formulation contains 28% of the active ingredients. The medium capsule diameter is 8-15 microns. The resulting formulation is applied to seeds as an aqueous suspension in an apparatus suitable for that purpose.

The composition of the present invention may be applied to a plant, part of the plant, plant organ, plant propagation material or a plant growing locus.

The application is generally made by spraying the composition, typically by tractor mounted sprayer for large areas, but other methods such as dusting (for powders), drip or drench can also be used. Alternatively the composition may be applied in furrow or directly to a seed before or at the time of planting.

The composition of the present invention may be applied pre-emergence or post-emergence. Where the composition is used to regulate the growth of crop plants or enhance the tolerance to abiotic stress, it may be applied post-emergence of the crop. Where the composition is used to inhibit or delay the germination of seeds, it may be applied pre-emergence. Where the composition is used to control pests, it may be applied as a preventative (before pest establishment) or curative (after pest establishment) treatment.

The present invention envisages application of the compositions of the invention to plant propagation material prior to, during, or after planting, or any combination of these. Although active ingredients can be applied to plant propagation material in any physiological state, a common approach is to use seeds in a sufficiently durable state to incur no damage during the treatment process. Typically, seed would have been harvested from the field; removed from the plant; and separated from any cob, stalk, outer husk, and surrounding pulp or other non-seed plant material. Seed would preferably also be biologically stable to the extent that treatment would not cause biological damage to the seed. It is believed that treatment can be applied to seed at any time between seed harvest and sowing of seed including during the sowing process.

Methods for applying or treating active ingredients on to plant propagation material or to the locus of planting are known in the art and include dressing, coating, pelleting and soaking as well as nursery tray application, in furrow application, soil drenching, soil injection, drip irrigation, application through sprinklers or central pivot, or incorporation into soil (broad cast or in band). Alternatively or in addition active ingredients may be applied on a suitable substrate sown together with the plant propagation material.

The rates of application of compositions of the present invention may vary within wide limits and depend on the nature of the soil, the method of application (pre- or post-emergence; seed dressing; application to the seed furrow; no tillage application etc.), the crop plant, the prevailing climatic conditions, and other factors governed by the method of application, the time of application and the target crop. For foliar or drench application, the compositions of the present invention are generally applied at a rate of from 1 to 2000 g/ha, especially from 5 to 1000 g/ha. For seed treatment the rate of application is generally between 0.0005 and 150 g per 100 kg of seed.

The compositions of the present invention may be applied to dicotyledonous or monocotyledonous crops. Crops of useful plants in which the composition according to the invention can be used include perennial and annual crops, such as berry plants for example blackberries, blueberries, cranberries, raspberries and strawberries; cereals for example barley, maize (corn), millet, oats, rice, rye, sorghum triticale and wheat; fibre plants for example cotton, flax, hemp, jute and sisal; field crops for example sugar and fodder beet, coffee, hops, mustard, oilseed rape (canola), poppy, sugar cane, sunflower, tea and tobacco; fruit trees for example apple, apricot, avocado, banana, cherry, citrus, nectarine, peach, pear and plum; grasses for example Bermuda grass, bluegrass, bentgrass, centipede grass, fescue, ryegrass, St. Augustine grass and Zoysia grass; herbs such as basil, borage, chives, coriander, lavender, lovage, mint, oregano, parsley, rosemary, sage and thyme; legumes for example beans, lentils, peas and soya beans; nuts for example almond, cashew, ground nut, hazelnut, peanut, pecan, pistachio and walnut; palms for example oil palm; ornamentals for example flowers, shrubs and trees; other trees, for example cacao, coconut, olive and rubber; vegetables for example asparagus, aubergine, broccoli, cabbage, carrot, cucumber, garlic, lettuce, marrow, melon, okra, onion, pepper, potato, pumpkin, rhubarb, spinach and tomato; and vines for example grapes.

Crops are to be understood as being those which are naturally occurring, obtained by conventional methods of breeding, or obtained by genetic engineering. They include crops which contain so-called output traits (e.g. improved storage stability, higher nutritional value and improved flavour).

Crops are to be understood as also including those crops which have been rendered tolerant to herbicides like bromoxynil or classes of herbicides such as ALS-, EPSPS-, GS-, HPPD- and PPO-inhibitors. An example of a crop that has been rendered tolerant to imidazolinones, e.g. imazamox, by conventional methods of breeding is Clearfield® summer canola. Examples of crops that have been rendered tolerant to herbicides by genetic engineering methods include e.g. glyphosate- and glufosinate-resistant maize varieties commercially available under the trade names RoundupReady®, Herculex I® and LibertyLink®.

Crops are also to be understood as being those which naturally are or have been rendered resistant to harmful insects. This includes plants transformed by the use of recombinant DNA techniques, for example, to be capable of synthesising one or more selectively acting toxins, such as are known, for example, from toxin-producing bacteria. Examples of toxins which can be expressed include d-endotoxins, vegetative insecticidal proteins (Vip), insecticidal proteins of bacteria colonising nematodes, and toxins produced by scorpions, arachnids, wasps and fungi.

An example of a crop that has been modified to express the *Bacillus thuringiensis* toxin is the Bt maize KnockOut (Syngenta Seeds). An example of a crop comprising more than one gene that codes for insecticidal resistance and thus expresses more than one toxin is VipCot® (Syngenta Seeds). Crops or seed material thereof can also be resistant to multiple types of pests (so-called stacked transgenic events when created by genetic modification). For example, a plant can have the ability to express an insecticidal protein while at the same time being herbicide tolerant, for example Herculex I® (Dow AgroSciences, Pioneer Hi-Bred International).

Normally, in the management of a crop a grower would use one or more other agronomic chemicals or biologicals in addition to the composition of the present invention.

The present invention also provides the use of the composition as defined above for controlling fungal pests.

EXAMPLES

Example 1

Tests were conducted to determine the fungicidal efficacy of compositions of the present invention.
Test Solutions
Components (A) and (B) were prepared respectively by dissolving the technical active ingredient in DMSO. The aqueous test solutions were prepared by mixing together the appropriate stock solutions to the desired concentrations.
Tests Against *Rhizoctonia solani* (Foot Rot, Damping-Oft)
Mycelial fragments of the fungus from cryogenic storage were directly mixed into nutrient broth (PDB potato dextrose broth) at a concentration of 2.5 ml mycelium per 50 ml PDB. A DMSO solution of the test compounds was placed into a microtiter plate (96-well format) and the nutrient broth containing the fungal spores was added to it. The test plates were incubated at 24° C. and the inhibition of growth was determined photometrically after 72 hrs. The results are shown in Table 1 below. Note that 1 ppm is equal to 1 mg/L or 1 µg/ml.

| Treatment | (A) Formula (Ia) ppm | (B) Difenoconazole ppm | Observed % activity | Expected action (colby) |
|---|---|---|---|---|
| (A) only | 5.0 | n/a | 7 | |
| (A) only | 10.0 | n/a | 0 | |
| (A) only | 20.0 | n/a | 0 | |
| (B) only | n/a | 2.0 | 47 | |
| (A) and (B) | 5.0 | 2.0 | 59 | 50 |
| (A) and (B) | 10.0 | 2.0 | 54 | 47 |
| (A) and (B) | 20.0 | 2.0 | 54 | 47 |

Tests Against *Pyricularia orzyae* (Rice Blast)
Conidia of the fungus from cryogenic storage were directly mixed into nutrient broth (PDB potato dextrose broth) at a concentration of 20,000 spores per ml PDB. A DMSO solution of the test compounds was placed into a microtiter plate (96-well format) and the nutrient broth containing the fungal spores was added to it. The test plates were incubated at 24° C. and the inhibition of growth was determined photometrically after 72 hrs. The results are shown in Table 2 below.

| Treatment | (A) Formula (Ia) ppm | (B) Difenoconazole ppm | Observed % activity | Expected action (colby) |
|---|---|---|---|---|
| (A) only | 0.1563 | n/a | 0 | |
| (A) only | 10.0 | n/a | 3 | |
| (B) only | n/a | 0.0625 | 34 | |
| (B) only | n/a | 0.25 | 71 | |
| (A) and (B) | 0.1563 | 0.0625 | 47 | 34 |
| (A) and (B) | 0.1563 | 0.25 | Not tested | n/a |
| (A) and (B) | 10.0 | 0.0625 | Not tested | n/a |
| (A) and (B) | 10.0 | 0.25 | 88 | 72 |

Tests Against *Glomerella lagenarium* syn. *Colletotrichum lagenarium* (anthracnose of *cucurbits*)
Conidia of the fungus from cryogenic storage were directly mixed into nutrient broth (PDB potato dextrose broth) at a concentration of 80,000 spores per ml PDB. A DMSO solution of the test compounds was placed into a microtiter plate (96-well format) and the nutrient broth containing the fungal spores was added to it. The test plates were incubated at 24° C. and the inhibition of growth was determined photometrically after 72 hrs at 620 nm. The results are shown in Table 3 below.

| Treatment | (A) Formula (Ia) ppm | (B) Difenoconazole ppm | Observed % activity | Expected action (colby) |
|---|---|---|---|---|
| (A) only | 0.6250 | n/a | 5 | |
| (A) only | 1.25 | n/a | 0 | |
| (A) only | 2.5 | n/a | 2 | |
| (A) only | 5.0 | n/a | 0 | |
| (A) only | 10.0 | n/a | 0 | |
| (B) only | n/a | 0.25 | 36 | |
| (A) and (B) | 0.625 | 0.25 | 68 | 39 |
| (A) and (B) | 1.25 | 0.25 | 78 | 36 |
| (A) and (B) | 2.5 | 0.25 | 77 | 37 |
| (A) and (B) | 5.0 | 0.25 | 73 | 36 |
| (A) and (B) | 10.0 | 0.25 | 92 | 36 |

The results show that combinations of formula (Ia) and difenoconazole have a synergistic fungicidal effect.

Example 2

Tests were conducted to determine the heat stress mitigation efficacy of compositions of the present invention.
Trials were conducted in the Tamil Nadu rice production area (India) during the hot season in 2016.
Rice (*Oryza sativa* L.) of the local variety ADT45 was mechanically transplanted at four plants per hill with a plant spacing of 16 cm and a row spacing of 30 cm. All trials were performed in good level of water management. Fertilizer was applied in accordance with the best local practice across the trial area.
Commercial treated seeds (no neonicotinoids as seed treatments) were used. Weed control was according to the best local practice in order to provide excellent weed control. Foliar fungicides and insecticides were applied according to common practice (no products that contain neonicotinoids or strobilurins).
The trial design was a randomized bloc design. Plot size was 40 m² (4 m width [12 rows] by 10 m row length). Each trial had four replicates. In total, eleven trials were conducted.
Treatments were applied with small-plot hand-held boom sprayer as broadcast foliar spray in close proximity to leaf/canopy surface (25-40 cm distance from the crop), at the following different treatment timings: panicle initiation (BBCH 30), panicle formation (BBCH 32), spikelet differentiation (BBCH 35) and meiosis (BBCH 39). Grain yield was measured at 14% moisture content (MC); the results are shown in Table 4.

TABLE 4

The effect of treatments on yield. All treatments were applied at panicle formation (BBCH growth stage 32). The mean daily minimum temperature was 25.13° C. (22.90° C. to 27.8° C.) and the mean daily maximum temperature was 34.13° C. (31.40° C. to 37.30° C.) during the 14 days after application.

| Treatment | Yield at 14% MC (kg/ha) | Average yield increase compared to UTC (%) |
|---|---|---|
| Untreated (UTC) | 6512 | n/a |
| Formula Ia (10 gAI/Ha) | 6820 | 4.4 |
| Protein hydrolysate* (2 L/Ha) | 6786 | 4.3 |
| Formula Ia (10 gAI/ha) + Protein hydrolysate* (2 L/Ha) | 6904 | 5.8 |

TABLE 4-continued

The effect of treatments on yield. All treatments were applied at panicle formation (BBCH growth stage 32). The mean daily minimum temperature was 25.13° C. (22.90° C. to 27.8° C.) and the mean daily maximum temperature was 34.13° C. (31.40° C. to 37.30° C.) during the 14 days after application.

| Treatment | Yield at 14% MC (kg/ha) | Average yield increase compared to UTC (%) |
|---|---|---|

*Product name: Isabion ™

The results demonstrate that rice yield was significantly higher following treatment with both Formula Ia and Isabion, than treatment with either component alone.

The invention claimed is:

1. A fungicidal composition comprising (A) a compound of formula (Ia),

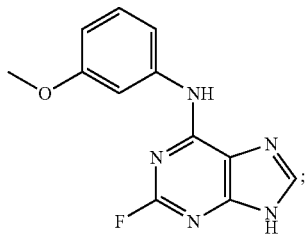

(Ia)

and (B) difenoconazole;
wherein the ratio of (A) to (B) is 40:1 to 2.5:1.

2. The composition of claim 1 further comprising one or more formulation adjuvants.

3. The composition of claim 1 wherein the concentration of (A) is from 1 to 50 g/L.

4. The composition of claim 1, wherein the concentration of (B) is from 1 to 250 g/L.

5. A method of controlling a fungal pest selected from the group consisting of *Rhizoctonia solani*, *Pyricularia orzyae* or *Glomerella lagenarium* comprising contacting the pests with the composition of claim 1.

6. A composition comprising:
(A) a compound of formula (I),

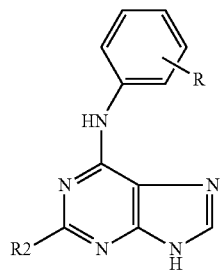

(I)

wherein R denotes one to five substituents independently selected from the group consisting of hydrogen, halogen, hydroxyl, amino, alkyloxy and alkyl;
and R2 is selected from the group consisting of amino, halogen, nitro, thio, alkylthio and alkyl; and
(B) a protein hydrolysate.

7. The composition of claim 6, wherein the protein hydrolysate is applied at a rate of 2 L/ha.

8. The composition of claim 6, wherein (A) is a compound of formula (Ia)

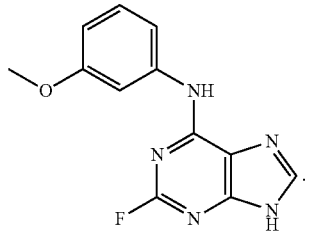

(Ia)

9. The composition of claim 7, wherein component (A) is applied at a rate of 10 g/ha.

* * * * *